United States Patent
Lysen et al.

(10) Patent No.: US 9,976,601 B2
(45) Date of Patent: May 22, 2018

(54) COUPLING DEVICE AND METHOD FOR DETERMINING THE MISALIGNMENT OF TWO SHAFTS

(71) Applicant: Prüftechnik Dieter Busch AG, Ismaning (DE)

(72) Inventors: Heinrich Lysen, Garching (DE); Roland Hölzl, Munich (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 284 days.

(21) Appl. No.: 14/648,254

(22) PCT Filed: Nov. 26, 2013

(86) PCT No.: PCT/DE2013/200318
§ 371 (c)(1),
(2) Date: Sep. 9, 2015

(87) PCT Pub. No.: WO2014/082637
PCT Pub. Date: Jun. 5, 2014

(65) Prior Publication Data
US 2015/0377301 A1 Dec. 31, 2015

(30) Foreign Application Priority Data
Nov. 28, 2012 (DE) .................. 10 2012 023 201

(51) Int. Cl.
*G01B 5/24* (2006.01)
*F16D 1/00* (2006.01)
*G01B 21/24* (2006.01)

(52) U.S. Cl.
CPC ............. *F16D 1/00* (2013.01); *G01B 5/24* (2013.01); *G01B 21/24* (2013.01); *F16D 2300/18* (2013.01)

(58) Field of Classification Search
CPC .................. G01B 21/24; G01B 5/24
(Continued)

(56) References Cited

U.S. PATENT DOCUMENTS

| 4,102,052 A | 7/1978 | Bloch |
| 4,367,594 A * | 1/1983 | Murray, Jr. .............. G01B 5/25 33/412 |

(Continued)

FOREIGN PATENT DOCUMENTS

| DE | 2755069 A1 | 6/1978 |
| DE | 10 2005 047 801 A1 | 4/2007 |

(Continued)

OTHER PUBLICATIONS

DE 102012023201.2, German Search Report, dated Jul. 17, 2013.
PCT/DE2013/200318, International Search Report, dated Apr. 15, 2014.

*Primary Examiner* — Yaritza Guadalupe-McCall
(74) *Attorney, Agent, or Firm* — Millman IP, Inc.

(57) ABSTRACT

The invention relates to a coupling device for connecting a first shaft (10) to a second shaft (12) by means of two flanges (16, 18, 22, 24) that are meshed with one another, wherein the flanges are provided or designed with means (30, 32, 111, 211, 311, 317, 319, 321) of enabling the axial and/or radial relative misadjustment thereof due to a misalignment of the shafts to be visually observed. According to one variant, at least one of the flanges or an element (20, 26) meshed with the two flanges is provided with at least one transducer (50, 60, 70, 80, 90, 94) for generating an electrical signal and/or acoustic signal from a mechanical movement, wherein said transducer is designed to generate the signal on the basis of a periodic movement of the flanges relative to one another, at least if the relative movement of the two shafts to one another, which occurs as the shafts (Continued)

Figure 1:
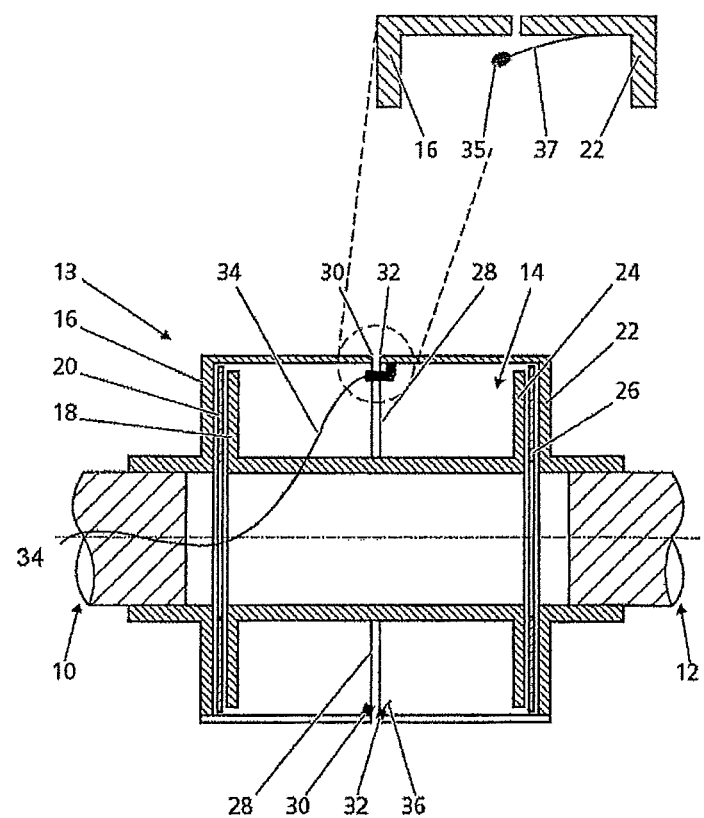

rotate due to misalignment of said shafts, exceeds a certain value.

15 Claims, 11 Drawing Sheets

(58) Field of Classification Search
USPC .............................................. 33/412
See application file for complete search history.

(56) References Cited

U.S. PATENT DOCUMENTS

| | | | |
|---|---|---|---|
| 4,428,126 A | | 1/1984 | Banks |
| 4,534,114 A | * | 8/1985 | Woyton .................. G01B 5/25 33/645 |
| 4,553,335 A | * | 11/1985 | Woyton .................. G01B 5/25 33/645 |
| 4,586,264 A | * | 5/1986 | Zatezalo ................. G01B 5/24 33/412 |
| 4,896,431 A | * | 1/1990 | Danmoto ............ B25J 17/0208 33/520 |
| 4,928,401 A | | 5/1990 | Murray, Jr. |
| 5,222,306 A | * | 6/1993 | Neumann ................ G01B 5/25 33/412 |
| 5,920,999 A | * | 7/1999 | Hutter .................... B25B 27/16 33/412 |
| 6,148,533 A | * | 11/2000 | Hutter .................... B25B 27/16 33/412 |
| 6,434,849 B1 | | 8/2002 | Hermann |
| 6,784,986 B2 | * | 8/2004 | Lysen ................. G01B 11/272 33/286 |
| 6,954,685 B2 | | 10/2005 | Altieri et al. |
| 7,175,342 B2 | * | 2/2007 | Tanaka ................... G01N 25/16 33/412 |
| 9,841,274 B2 | * | 12/2017 | Holzl .................... G01B 11/14 |
| 2011/0113888 A1 | * | 5/2011 | Busch ................. G01B 11/272 73/655 |
| 2015/0377301 A1 | * | 12/2015 | Lysen .................. G01B 21/24 464/23 |
| 2016/0223320 A1 | * | 8/2016 | Holzl .................. G01B 11/272 |

FOREIGN PATENT DOCUMENTS

| | | |
|---|---|---|
| DE | 10 2010 006 254 A1 | 8/2011 |
| WO | 2012/002901 A2 | 1/2012 |

* cited by examiner

COUPLING DEVICE AND METHOD FOR DETERMINING THE MISALIGNMENT OF TWO SHAFTS

The present invention relates to a coupling device for connecting a first shaft to a second shaft, said coupling device comprising two flanges that are meshed with each other.

In order to minimize the wear of the shaft bearings and of the coupling, the shafts should be oriented insofar as possible in precise alignment with each other. A large number of different methods are known for determining the misalignment of shafts; typically, a measuring instrument is placed on the circumferential surface of each shaft and at least one of the two measuring units is designed to generate a light beam bundle and at least one of the two measuring units is designed to record the impingement position of the light beam bundle on a detection surface. An overview of such optical methods may be found in U.S. Pat. No. 6,434,849 B1, for example.

The problem of the present invention is to create a coupling device for two shafts, by means of which an unpermitted misalignment of the shafts can be detected in a way that is as simple as possible. A further problem of the present invention is to create a method that is as simple as possible for determining the misalignment of shafts that are coupled by means of such a coupling device.

This problem is solved according to the invention by a coupling device as well as a method as disclosed herein.

In the solution according to an aspect, it is advantageous that, owing to the fact that two flanges of the coupling device, which are meshed with each other, are provided or designed with means for making it possible for the axial and/or radial relative misadjustment thereof, due to a misalignment, to be visually observed, a misalignment can be detected in an especially simple way with minimal effort in terms of construction. According to a preferred embodiment, the flanges are designed with a bell shape in such a way that a circumferential axial gap is formed between the flanges, so that the misalignment of the two shafts with respect to each other can be determined from a visual assessment of the gap.

According to an alternative preferred embodiment, the flanges are designed with a bell shape in such a way that the end portions thereof overlap at least partially in the axial direction and are provided with marking elements so as to enable the position thereof with respect to each other to be visually detected.

According to another alternative preferred embodiment, the flanges are designed with a bell shape in such a way that a circumferential axial gap is formed between the flanges and a circumferential ring is attached in the region of the gap at the edges of the flange forming the gap, said circumferential ring being designed such that its state and/or its relative position with respect to the flange changes, owing to the load ensuing from relative movement of the flanges forming the gap due to an unpermitted misalignment of the shafts during rotation of the shafts, and this change can be observed in a visual manner.

In this case, the ring can be displaced and tilted axially with respect to the flange owing to a misalignment of the shafts, and the flange and the ring can be provided with marking elements so as to enable visual detection of the position of the ring.

In the solution according to an aspect, it is advantageous that, by providing at least one of the flanges or one of the elements meshing with the two flanges with at least one transducer for generating an electrical signal or an acoustic signal from mechanical movement, the periodic relative movement of two flanges, which are meshed with each other, which occurs when there is a misalignment of the shafts during rotation can be converted into an electrical signal in a direct and simple way, so as to determine from this, for example, the misalignment of the shafts, or can be converted into an acoustic alarm, so as to indicate a misalignment.

The electrical signal generated in this way not only can be used for analysis, but it can also be used as a power source for electrical devices provided on or in the coupling flanges, such as, for example, for a telemetric device, which transmits wirelessly the transducer signals or signals derived from the transducer signals to a stationary unit, for example, an analysis unit.

Alternatively or additionally, the transducer signal can be fed to a speaker in order to generate a sound signal corresponding to the misalignment of the shaft.

According to an embodiment, the sound-generating means is realized by a bell-shaped design of the corresponding flange, with the excitation element being designed so as to excite the bell-shaped flange to produce acoustic vibration by periodic contact with it when the axial and/or radial relative movement of the corresponding flanges with respect to each other owing to a misalignment of the shafts exceeds a certain value. According to an alternative embodiment, the sound-generating means can have a pump, which can be actuated by axial movement of the excitation means, as well as an air vibration generator in order to convert an axial movement of the excitation element relative to the sound-generating means into an air flow, which is induced into self-excited vibration by means of the air vibration generator, so as to generate a corresponding sound signal. According to a variant, the sound-generating means can have a vibration element, which can be excited by axial movement of the excitation element to produce vibration so as to generate a corresponding sound signal.

The solution according to an aspect is advantageous insofar as, owing to the bell-shape design of the flanges with a circumferential gap in between, it is possible to detect in an especially simple way a misalignment of two shafts with respect to each other by visual assessment of the gap, preferably from at least two different radial directions.

Preferably, the two different radial directions form an angle of about 90° with respect to each other, with preferably the vertical direction and the horizontal direction being the directions in question. According to an embodiment, a respective image of the gap or of the gaps can be recorded from the two different radial directions, with it being possible to measure the gap or the gaps in the image. Alternatively, the gap or the gaps can be sighted from the two different retaining devices.

Further preferred embodiments of the invention ensue from the dependent claims.

Figure 2:
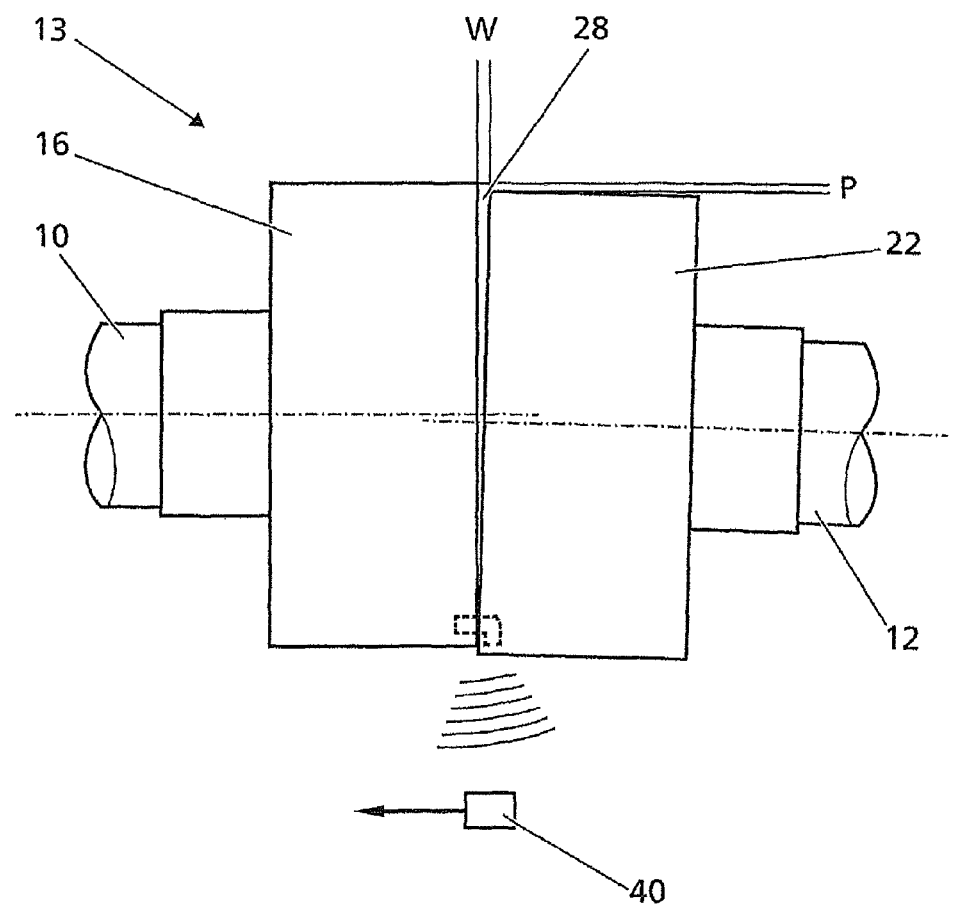
Figure 3:
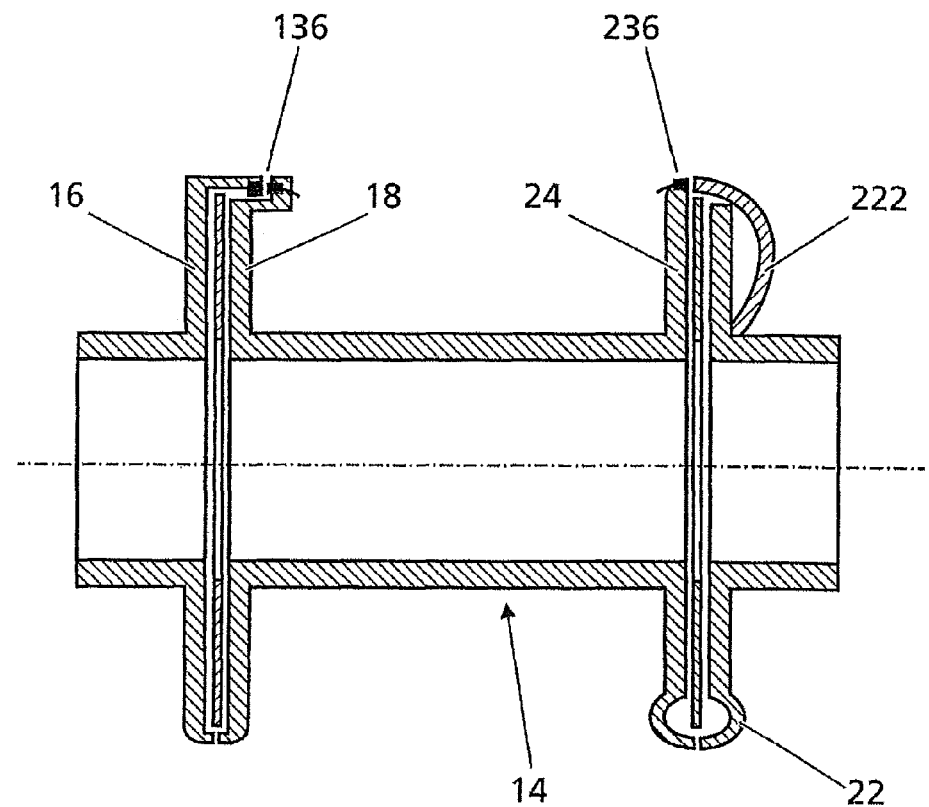
Figure 4:
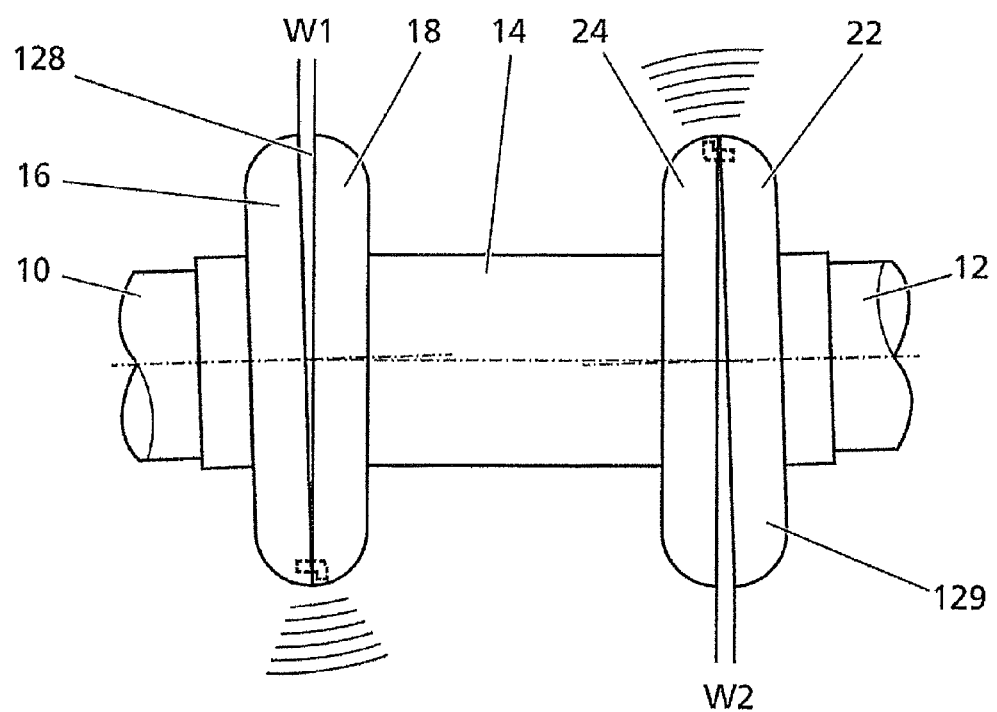
Figure 5:
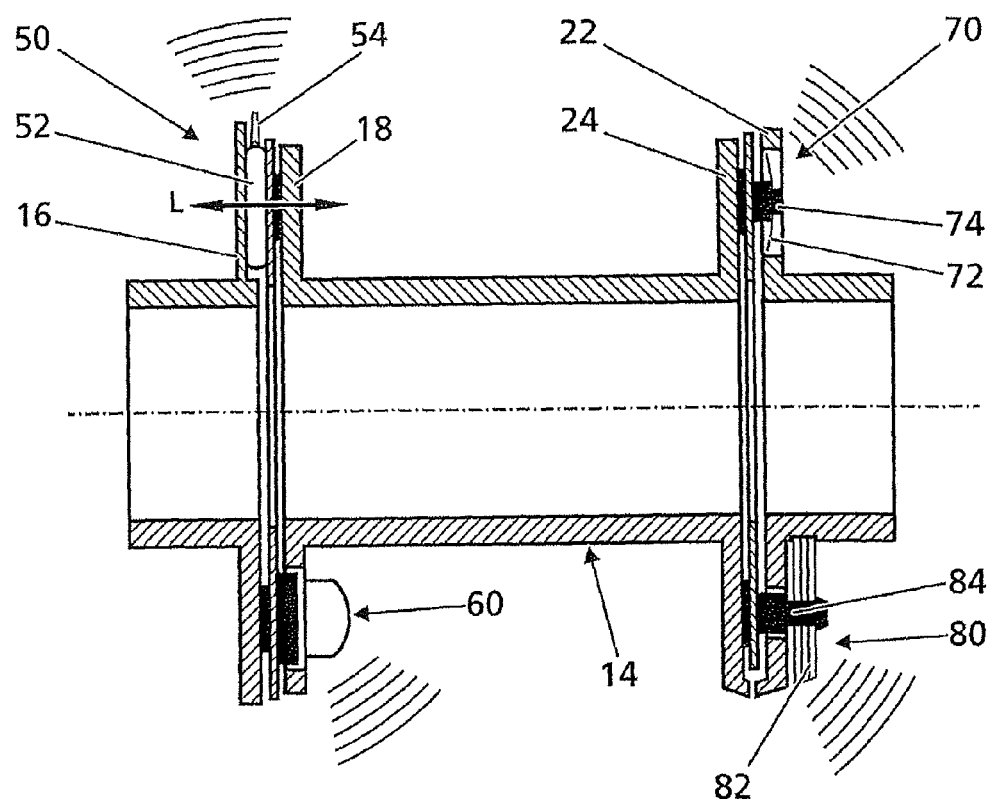
Figure 6:
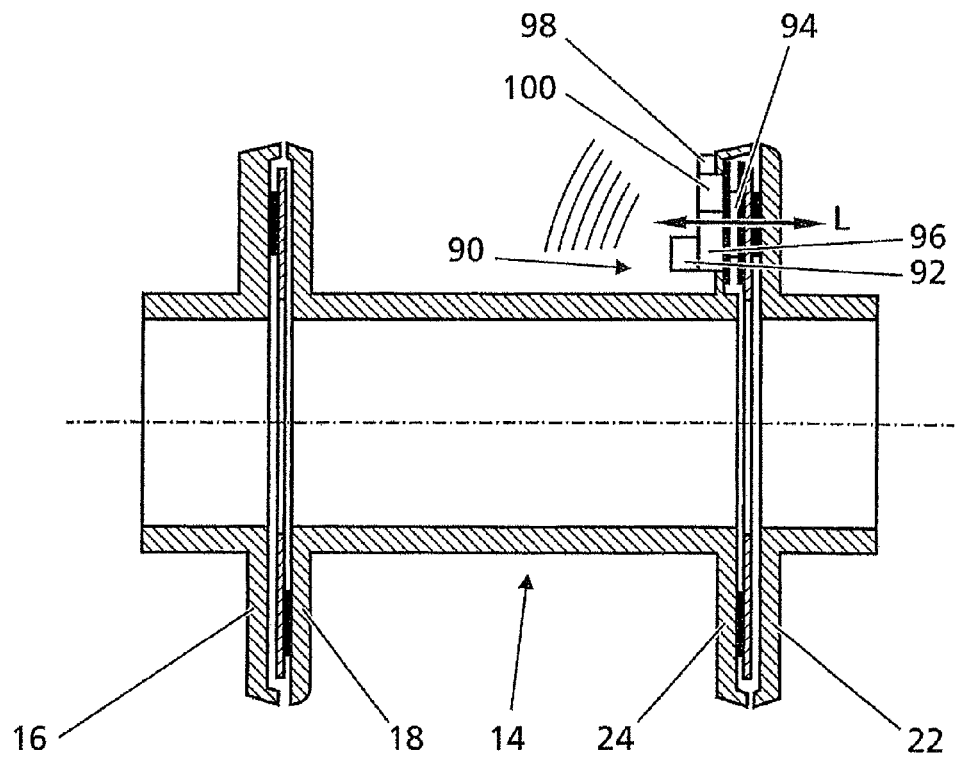
Figure 7A:
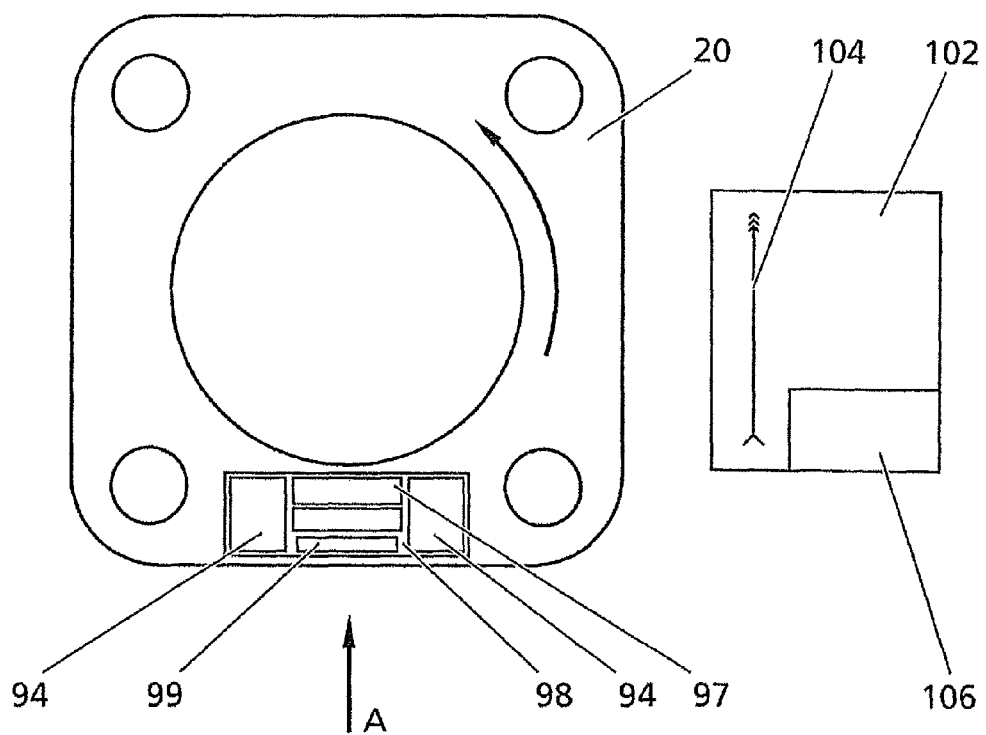
Figure 7B:
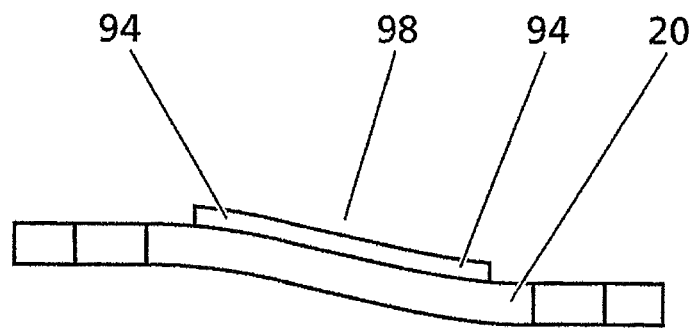
Figure 8:
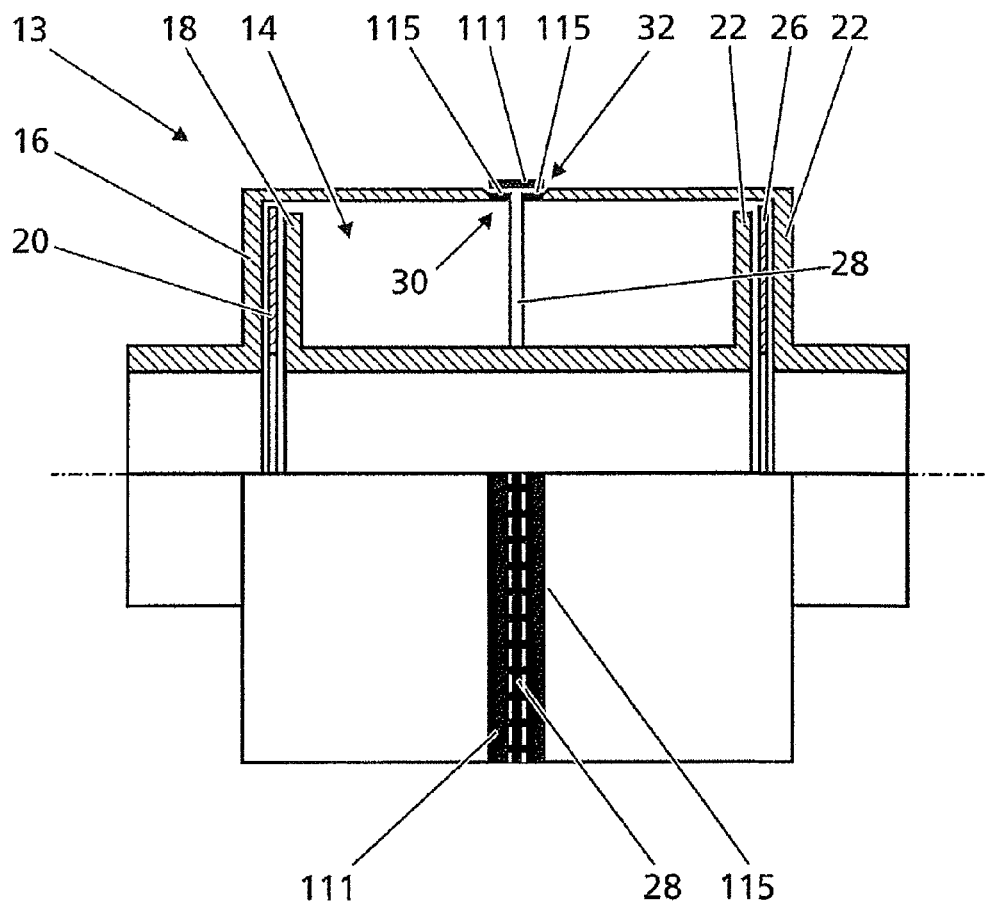
Figure 9:
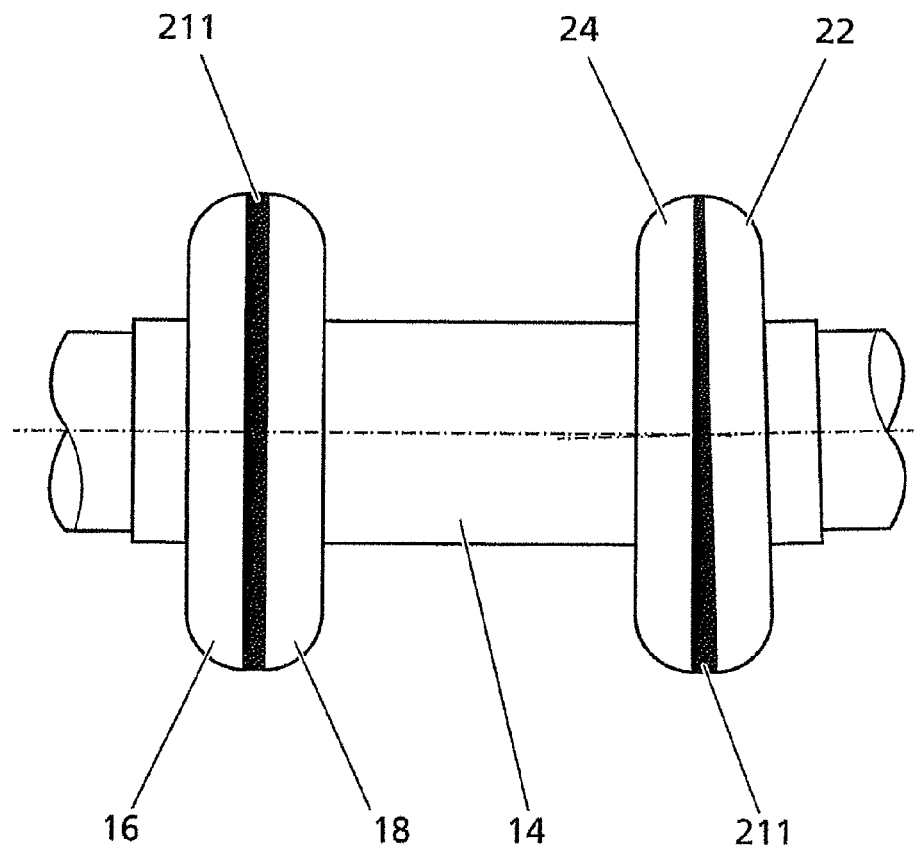
Figure 10:
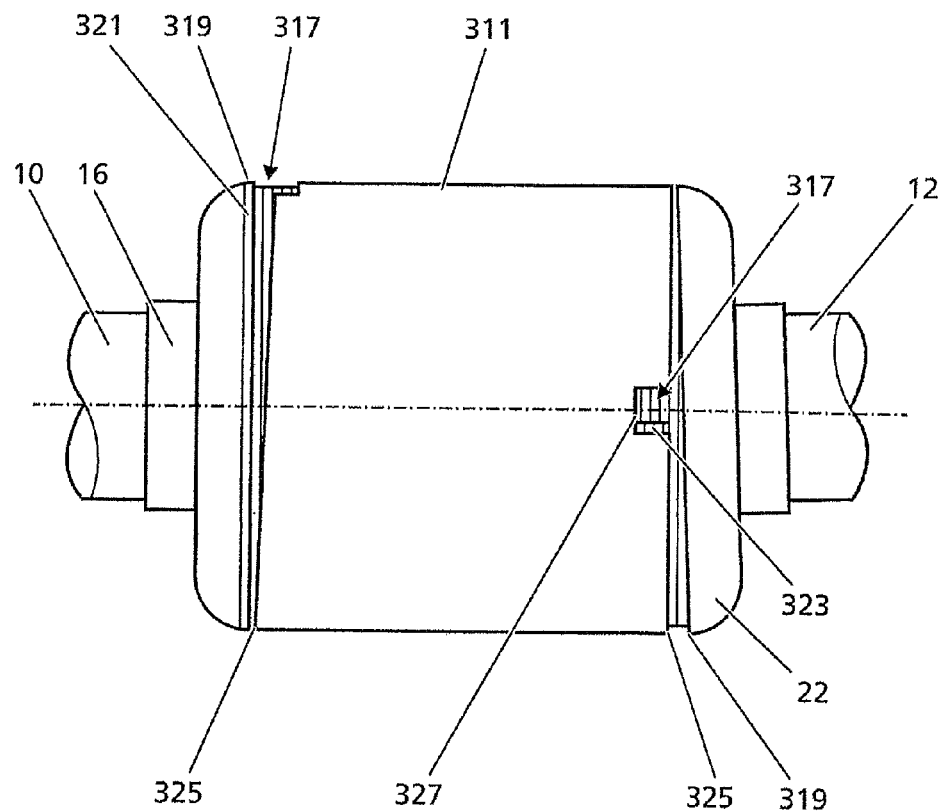

The invention will be described in detail below on the basis of the attached drawings. Shown are:

FIG. 1 a longitudinal sectional view of a first example of a coupling device according to the invention;

FIG. 2 a side view of the coupling device of FIG. 1;

FIG. 3 and 4 views, as in FIG. 1 and FIG. 2, in which other examples of the invention are illustrated;

FIG. 5 a view, as in FIG. 3, in which an alternative example of the invention is illustrated;

FIG. 6 a view, as in FIG. 5, in which another alternative example of the invention is illustrated;

FIG. 7A, 7B a frontal view of an example of a coupling membrane according to the invention and a view in the radial direction A of FIG. 7A;

FIG. 8 a partially cut-away side view of another example of a coupling device according to the invention;

FIG. 9 a side view of another alternative example of a coupling device according to the invention; and FIG. 10 a side view of another alternative example of a coupling device according to the invention.

Illustrated in FIG. 1 is a longitudinal sectional view of a first example of a coupling device 13 according to the invention for coupling a first shaft 10 and a second shaft 12, which has a first coupling flange 16 for fastening to the first shaft 10, a second coupling flange 22 for fastening to the second shaft 12, and an adapter 14, provided with a first adapter flange 18 for meshing with the first coupling flange 18 and a second adapter flange 25 for meshing with the second coupling flange 22.

The meshing between the respective flanges 16 and 18 or 22 and 24 occurs via a frictional fit by means of a coupling disc (coupling membrane) 20 or 26, respectively. The two coupling flanges 16, 22 are designed with a bell shape and surround the adapter 14 at least partially, so that a circumferential axial gap 28 results between the two flanges 16, 22. Here, the gap 28 reflects the axial distance between the two end edges 30 of the flanges 16 and 22.

The flanges 16 and 22 surround the respective ends of the shafts 10 and 12.

Owing to the fixed connection of the flanges 16, 22 to the shafts 10, 12, the gap 28 correspondingly reflects any misalignment of the two shafts 10, 12 with respect to each other. According to a first embodiment of the invention, said gap can be exploited to determine the misalignment of the two shafts 10, 12 with respect to each other by visual measurement of the gap 28 from at least two different radial directions. Preferably, the two radial directions form an angle of about 90° with respect to each other, this involving preferably a vertical direction and a horizontal direction. The measurement of the gap 28 can occur fundamentally by visual inspection or by taking corresponding photos by means of a camera (not shown in FIG. 1). The camera also can be a smartphone, for example. The gap 28 can be measured on the basis of images being recorded from different radial directions, with the image analysis preferably being performed automatically by means of suitable software.

Shown in FIG. 2 is a side view of the device of FIG. 1, from which it can be seen that the components of the parallel offset of the shafts 10, 12 ensues from the radial offset of the tangential faces of the flanges 16, 22 at the two opposite-lying ends of the gap in the corresponding image view (indicated with "P" in FIG. 2). In this case, the view from the horizontal direction, for example, affords the vertical components of the parallel offset and the vertical view affords the horizontal components of the parallel offset.

The respective components of the angular offset of the shafts 10, 12 can be determined from the course of the width of the gap 28 along the gap 28. Illustrated in FIG. 2 is an example in which solely a vertical angular offset "W" exists, but not a horizontal angular offset, so that, from the horizontal view, the vertical component W of the angular offset is derived as the difference in the gap width at two opposite-lying ends of the gap 28. If both a vertical angular offset and a horizontal offset exist, both views need to be analyzed.

It is fundamentally possible for the described visual measurement of the gap 28 to occur both when the shafts 10, 12 are at standstill and when the shafts 10, 12 are rotating.

Preferably, the flanges 16, 22 are designed in such a way that, when the shafts are in ideal alignment, the resulting width of the gap 28 is no greater than three times the change in the gap width when there is a maximum permitted misalignment of the shafts 10, 12 in comparison to the shafts 10, 12 in ideal alignment (shafts in ideal alignment are shown in FIG. 1, whereas the shafts in FIG. 2 are arranged both with parallel offset P and with vertical angular offset W with respect to each other).

In order to enable a good visual assessment of the gap 28, the bevel of the edges 30, 32 that delimit the gap should be smaller than the permitted misalignment of the shafts 10, 12.

Furthermore, the width of the gap 28 should not exceed the permitted axial play of the coupling device 13.

A modification of the principle of visual determination of the misalignment illustrated on the basis of FIG. 2 is shown in FIG. 4, in which not only the two coupling flanges 16, 22 of the shafts 10, 11, but also the adapter flanges 18, 24 are designed with a bell shape; in this case, two circumferential axial gaps are formed, namely, a first gap 128 between the two flanges 16 and 18 that mesh with each other as well as a gap 129 between the two flanges 22 and 24 that mesh with each other. Here, too, the two gaps 128, 129 are viewed from at least two different radial directions, as in the example in FIG. 2. In this case, in contrast to the example of FIG. 2, the two gaps 128, 129 can be employed, with said gaps behaving as mirror images; that is, whereas, in the case of the gap 128, the width of the top end increases owing to the angular offset and decreases at the bottom end, as viewed in FIG. 4, and this is exactly the opposite in the case of the gap 129.

It is especially advantageous for the described visual measurement method when the respective gap is formed so as to be as completely as possible circumferential; this means that the respective bell-shaped flanges are as fully as possible circumferential.

The bell-shaped design of the flanges hitherto described in regard to FIGS. 2 and 4 can be used, however, not only for a visual measurement, but also for an acoustic alert of any misalignment of the shafts. In this case, in the example of FIG. 2, at least one of the two flanges 16, 22 is designed in such a way that it is constructed for sound generation by means of periodic mechanical excitation in the vicinity of the end edge 30 or 32. In this case, a bell-shaped design of the other flange 22 or 16, respectively, is not required for the sound generation.

In the example shown in FIGS. 1 and 2, the flange 22 is provided with excitation elements 34, 36, which are designed so as to excite the bell-shaped flange 16 into acoustic vibrations by periodic contact when, during rotation of the shafts 10, 12, a certain value is exceeded in any misalignment of the shaft resulting from the axial and/or radial relative movement of the flanges 16, 22 with respect to each other. This principle of acoustic excitation is based on the fact that, during a revolution of the shafts 10, 12, the width varies at each position of the gap between the minimum value and the maximum value and also the radial offset traverses the full stroke between the maximum in one direction and the maximum in the other direction.

In this case, it is advantageous to provide a separate excitation element 34, 36 for the angular offset and for the parallel offset. In the example of FIG. 1, the excitation element 34 is designed for an excitation based on the parallel offset, whereas the excitation element 36 is designed for an excitation based on the angular offset. In this case, the excitation element 34 is designed so as to convert the relative radial movement that ensues with respect to the flange 16, when the shafts 10, 12 are rotating, into a periodic contact of the flange 16 in the region of its end edge 30, and the excitation element 36 is designed so as to convert the relative axial movement of the excitation element 36 that ensues with respect to the flange 16, when the shafts 10, 12 are rotating, into a periodic contact of the flange 16 in the region of its end edge 30. In this case, the respective relative radial or axial movement ensues from the parallel offset or angular offset of the two shafts 10, 12.

For example, the "radial" excitation element 34 can be designed as the clapper 35 engaging under the flange 16. In this case, the clapper 35 can be fastened to a spring 37 that has a nonlinear characteristic and extends essentially in the axial direction. The ensuing distance of the clapper 35 from the inner wall of the flange 16 in the radial direction thereby determines the parallel offset above which the clapper 35 contacts the flange 16 one time during a revolution of the shafts 10, 12. In this case, this radial distance is determined by the corresponding design of the excitation element 34, that is, by the geometry of the spring 37 in the example shown, said radial distance corresponding to the permitted maximum misalignment in regard to the parallel offset. Such an arrangement then produces an acoustic alarm corresponding to the periodic excitation of the bell of the flange 16, when the permitted parallel offset is exceeded, and said acoustic alarm can be heard by persons in the vicinity of the shafts 10, 12. Corresponding considerations apply in regard to the excitation element 36 provided for the angular offset; here, the axial distance of the excitation element 36 is determined by a counterpiece provided on the end edge 30 of the flange 16. That is, the excitation element 36 is designed geometrically in such a way that the counterpiece reaches the flange 16 one time during a revolution of the shafts 10, 12 only when the permitted angular offset is exceeded. In this way, the excitation element 36 thus produces an acoustic alarm by corresponding excitation of the bell of the flange 16 as soon as the permitted angular offset is exceeded.

Analogous considerations also apply for the embodiments according to FIGS. 3 and 4, in which at least one of the flanges is to be formed with a bell shape in such a way that it is excited periodically by a corresponding excitation element of the flange that meshes with the bell-shaped flange as soon as the angular offset and/or parallel offset exceeds a certain permitted value.

In this case, the flange can be designed in such a way that an acoustic alarm signal is produced only in the region of one of the two gaps 128, 129 or else an acoustic alarm signal can be produced in the region of the two gaps.

Shown in FIG. 3 are several examples of bell-shaped designs of flanges as well as examples of corresponding excitation elements. For example, according to FIG. 3, the first coupling flange 16 has a bell-shaped design and is excited to vibrate by means of an excitation element 136 of the first flange 18 of the adapter 14 in the axial direction as soon as the angular offset exceeds the permitted value. Shown by 236 is an excitation element of the second adapter flange 24, which excites a bell-shaped structure 222 of the second coupling flange 22 in the axial direction.

It is fundamentally possible for both acoustically interacting flanges to be designed with a bell shape; that is, also the flange having the excitation element can be designed with a bell shape so as to be set itself into vibration and to emit a sound signal. In this case, the frequencies of the two bells can be chosen to be disharmonic, for example, so that the ratio of the frequencies lies between 0.93 and 0.96, for example.

Furthermore, a plurality of excitation elements distributed in the circumferential direction can be provided, with it then being possible for said excitation elements to be irregular over the circumferential direction; that is, the spacings in the circumferential direction are not regular.

In order to make possible an acoustic remote monitoring of the shafts 10, 12, an acoustic emission microphone 40 (see FIG. 2) can be positioned in the vicinity of the coupling device 13 so as to catch acoustic alarm signals and forward them electronically to a person located remotely from the coupling device 13.

Shown in FIGS. 5 and 6 are variants for producing an acoustic misalignment alarm, in which a bell-shaped design of a flange is not required. Instead of this, at least one of the flanges is provided with a sound-generating means, which is periodically actuated axially and/or radially by means of an excitation element on the flange that is meshed with the flange provided with the sound-generating means, at least when the misalignment of the two shafts exceeds a certain value, with the sound-generating means being designed in the examples shown for producing a flow of air or for generating vibrations of an element that can vibrate.

In the examples shown in FIGS. 5 and 6, solely the axial movement, ensuing from the angular offset, of the two flanges that are meshed with each other, is exploited in each case (this direction of movement is indicated in FIGS. 5 and 6 by "L"). In the course of a revolution of the shafts 10, 12, this axial longitudinal dimension L alters in a sinusoidal pattern over time in this case.

Shown in FIG. 5 is a sound generator 50, which is designed as part of the flange 16 and has a pump 52 that can be actuated by axial movement of the flanges 16 and 18 relative to each other and converts the relative axial movement of the flanges 16, 18 with respect to each other into a flow of air, which is set into self-excited vibration by means of an air vibration generator 54 in order to produce a sound signal corresponding to the relative axial movement of the two flanges 16 and 18 with respect to each other. The air vibration generator is preferably designed as a pipe, such as, for example, a reed pipe, with the flow of air being produced in the radial direction in the sound generator 50. The pump 52 can be designed, for example, as a kind of diaphragm pump, a piston pump, an air pump with valves, or a bellows and also have a compressed air tank, for example.

Shown on the bottom left in FIG. 5 is another example of a sound generator 60, which is also designed as a pipe, such as, for example, a lipped pipe, a steam pipe, or a ring gap pipe, with it being possible here, too, to produce the flow of air that is to be set into vibration by means of an axially actuated pump.

Another sound-generating principle is shown on the right side of FIG. 5, in which, for example, the flange 22 is provided with a sound generator 70 that has a vibrational element 72, which is set into vibration by the relative axial movement between the flanges 22 and 24 during shaft revolution, at least insofar as the angular offset has exceeded a certain value. In the example shown at top right in FIG. 5, the vibrational element is designed as a clicker, which is actuated by relative axial movement of an excitation element during shaft revolution. This excitation element is identified by reference 74 in FIG. 5.

Further shown in the bottom right in FIG. 5 is an example of a sound generator 80, which has a diaphragm, a clapper, or a whip as the vibrational element 82, for example, which is excited by an excitation element 84 in the axial direction.

The sound generators 50 and 60 produce whistling sounds, whereas the sound generators 70 and 80 instead produce rattling sounds on account of the nonlinear excitation. The excitation element 74, 84 can be designed as a plunger or piston, for example. It is fundamentally possible for the sound generators 50, 60, 70, 80 of FIG. 5 to be designed in such a way that the sound is generated only above a minimum stroke of the relative axial movement of the two respective flanges with respect to each other. An alternative sound-generating principle is shown in FIG. 6, in which the flange 24 is provided with a sound generator 90, which comprises a speaker 92 and a transducer 94, which converts a relative axial movement of the two flanges 22 and 24 into an electrical signal or into electrical energy in order to produce a sound signal by means of the speaker 92, said sound signal representing the relative axial movement of the flanges 22 and 24 with respect to each other. By means of such an arrangement, the mechanical energy is transduced into electrical energy by means of the transducer 94 and the electrical energy, in turn, can be transduced into acoustic energy by means of the speaker 92.

The transducer 94 is preferably a piezoelectric transducer.

According to an alternative embodiment, the sound generator 90 can be provided with an analysis device 96, which determines the angular offset from the transducer signal and enables a corresponding plain text signal to be sent to the speaker 92 by means of speech synthesis, for example, in the manner of "the misalignment is 0.45 mm," for example.

Instead of a speaker 92, it is possible to provide a telemetric device 98, which transmits wirelessly the signals of the transducer 94 or the signals derived from the transducer signals, which represent the state of misalignment, to a stationary unit (not shown). Insofar as the telemetric device transmits the transducer signals itself, the analysis device is not designed as part of the arrangement 90, but rather as a part of the stationary unit to which the transducer signals are transmitted wirelessly.

Preferably, in the embodiment of FIG. 6, an inclinometer 100 is also provided, which constitutes a part of the arrangement 90, for example, and is provided for determining the misalignment of the corresponding flange, in which it is provided, with respect to the verticals; furthermore, it is possible by means of the inclinometer 100 to determine the rotational speed and the phase of rotation of the rotational movement of the shafts 10, 12 when the inclinometer signal is fed to the analysis unit 98. The determination of the phase of rotation is of interest, in particular, for the analysis of the time course of the signal of the transducer 94, because only then is it possible to make a correct assignment of the angular offset to a vertical component and a horizontal component.

Insofar as the rotational speed is recorded, it is also possible to emit the alarm as a function of the rotational speed in that, for example, the intensity of the alarm decreases with increasing rotational speed.

Shown in FIGS. 7A and 7B is a modification of the principle of FIG. 6, in which a coupling membrane 20 having piezo transducers 94 and a telemetric device 98 with an energy storage device 97 and an antenna 99 is provided in order to wirelessly transmit the electrical energy that results from any deflection of the coupling membrane—and thus the piezo transducer 94—to a stationary receiving unit 102, which has an analysis device 196 and an antenna 104. In this case, the analysis unit 196 can be designed so as to determine the instantaneous angle of rotation or the phase of rotation of the coupling device 13 from the change in attenuation that occurs between the antenna 99 of the telemetric device 98 and the antenna 104 of the stationary receiving unit during a revolution of the coupling device 13.

In this way, it is possible to determine the phase position of the transducer signal in order to divide the angular offset into its two components (horizontal, vertical), for example. Furthermore, the signal transmission can be controlled in such a way that the signal transmission takes place essentially only at points in time at which the two antennas 99, 104 are situated especially favorably with respect to each other.

Shown in FIG. 8 is an example of a modification of the principle illustrated in FIG. 1, where, in the region of the gap 28 between the bell-like coupling flanges 16, 22, a circumferential ring 111 is attached at the edges 30, 32 of the flanges 16, 22 that form the gap 28, said circumferential ring being designed in such a way that its state changes in a visible manner owing to the load due to a relative axial and/or radial movement resulting from an unpermitted misalignment of the shafts during revolution of the shafts 10, 12. In the example of FIG. 8, the ring 111 is fabricated from brittle material and covers the gap 28 and the edges 30, 32 of the flanges 16, 22 as long as the misalignment of the shafts 10, 12 lies in the permitted range. In this case, the ring 111 is designed in such a way that it splits off at least partially if the misalignment moves out of the permitted region, owing to the relative movement of the flanges 16, 22 caused by the misalignment. In this case, the region 115 of the edges 30, 32 that is covered by the ring 111 is constructed as an optical marking and is kept in colors, for example, that are different than the ring 111. In the bottom part of FIG. 8, an example is shown in which the ring 111 has already split off partially.

An alternative example is shown in FIG. 9, which is adapted to the principle of FIG. 4, where all four flanges 16, 18, 22, 24 are formed with a bell shape. In the example of FIG. 9, the ring 211 is fabricated from plastic material in this case and is designed in such a way that it is heated owing to the load due to a relative axial and/or radial movement resulting from an unpermitted misalignment during revolution of the shafts. If the ring 211 is made of thermochromic material, the color of the ring 211 changes on account of the heating, so that any unpermitted misalignment can be detected on the basis of the color of the ring 211.

Alternatively, the temperature of the ring 211 can be monitored thermographically.

Another variant, which has a circumferential ring 311 in the edge region 30, 32 of the coupling flanges 16, 22, is shown in FIG. 10, in which the ring is designed with a broad construction and in such a way as to be axially displaceable and inclinable with respect to the flanges 16, 22 when there is any misalignment of the shafts. The flanges 16, 22 and the ring 311 are provided with marking elements in order to make the relative position of the ring 311 visually apparent. In the example shown, the marking elements of the flanges are designed as at least partially circumferential rings 317 or from at least partially circumferential edges 319, and the marking elements of the ring are formed from at least partially circumferential edges 325 or broken edges 327. The marking elements of the flanges 16, 22 may also have a calibrating ring 321. The marking elements of the ring 311 can also have at least one scale 323 extending in the axial direction, said scale interacting with the rings or bars on the flange so as to create a Vernier function, for example.

The marking elements serve to enable detection or readout of any misalignment of the shafts 10, 12 on the basis of the corresponding relative positional displacement of the ring 311 with respect to the flanges 16, 22.

According to a modified variant, the ring could be more or less a part of one of the two flanges 16, 22, so that, in this case, the edge regions 30, 32 of the flanges 16, 22 overlap at least partially in the axial direction. The relative displacement of the flanges 16, 22 on account of a misalignment of the shafts 10, 12 can then be directly detected or read off in a way similar to that of the example in FIG. 10 on the basis of the marking elements.

The invention claimed is:

1. A coupling device for connecting a first shaft (10) to a second shaft (12) having two mutually engaging flanges (16, 18, 22, 24), characterized in that the flanges have means (30, 32, 111, 211, 311, 317, 319, 321) permanently mounted thereon in order to make optically observable their relative axial and/or radial displacement due to misalignment of the shafts.

2. A device according to claim 1, further characterized in that:
 the flanges (16, 22) are bell-shaped in a manner that an encircling axial gap (28) is formed between the flanges, so that the misalignment of the two shafts with respect to each other can be determined from a visual inspection of the gap, or
 the coupling device has a first coupling flange (16) for attachment to the first shaft, a second coupling flange (22) for attachment to the second shaft, as well as an intermediate piece (14) having a first intermediate piece flange (18) for engagement with the first coupling flange and a second intermediate piece flange (24) for engagement with the second coupling flange, and wherein the flanges are bell-shaped in such a way that an encircling axial gap (128, 129) exists between two mutually engaging flanges in each case, such that the misalignment of the two shafts with respect to each other can be determined from a visual inspection of the two gaps, or
 the flanges (16, 22) are bell-shaped in such a way that their edge regions (30, 32) overlap at least partially in the axial direction and have marking elements (317, 319, 321, 325, 327) in order to make optically recognizable their position relative to each other, or
 the flanges are formed as a bell shape in such a way that an encircling axial gap (28) is formed between the flanges, wherein in the region of the gap, an encircling ring (111, 211, 311) is attached at the edges (30, 32) of the gap-forming flanges (16, 22), the encircling ring designed in such a way that its state and/or its relative position with respect to the flanges changes in an optically observable manner due to stressing that occurs due to a relative movement of the flanges forming the gap resulting from an inadmissible misalignment of the shafts during relative motion of the gap-forming flanges.

3. A device according to claim 2, characterized in that:
 the width of the gap or of each gap (28, 128, 129) does not exceed the permissible axial play of the coupling, or
 the marking elements of the flange at least partially encircling rings (317), at least partially encircling edges (319, 325), or perforated edges (327), or
 the ring (311) can be displaced or tipped axially relative to the flanges (16, 22) due to a misalignment of the shafts (10, 12), and the flanges and the ring have marking elements (317, 319, 321, 323, 325, 327) in order to make the position of the ring optically recognizable, or
 the ring (111, 211) is fabricated from brittle material and conceals the gap (28, 128, 129) and the edges (30, 32) of the gap-forming flanges (16, 18, 22, 24), as long as the misalignment of the shafts lies within the permissible range, wherein the ring is designed to break off at least partially due to stressing during relative movement of the flanges resulting from an impermissible misalignment of the shafts (10, 12) during relative movement of the flanges, or
 that the ring (211) fabricated of plastic material, wherein the ring is heated in a thermographically observable manner due to the stressing during relative movement of the flanges (16, 18, 22, 24), resulting in an impermissible misalignment of the shafts during the rotation of the shafts.

4. The device according to claim 3, characterized in that:
 the marking elements of the flanges (16, 22) have at least one of at least partially encircling rings (317) and edges (319), or
 the marking elements of the ring (311) have perforated edges (327) or at least partially encircling edges (325), or
 the marking elements (317, 323) of the flanges (16, 22) and the ring (311) form a nonius or vernier scale, or
 the marking elements of the flanges (16, 22) have a calibration ring (321) or
 the marking elements of the ring (311) have a scale (323) extending in the axial direction, or
 the region (115) of the edges (30, 32) of the gap-forming flanges (16, 22) forming the gap and concealed by the ring (111) is designed as an optical marking, or
 the ring (211) is made of thermochromic material, so that the color of the ring changes due to heating.

5. The device according to claim 1, characterized in that:
 at least one of the flanges (24) is provided with at least one inclinometer (100), or
 at least one of the flanges (24) is provided with at least one inclinometer (100) that is constructed and arranged to determine the misalignment of the orientation of the inclinometer flange (18) with respect to the vertical, or
 at least one of the flanges (24) is provided with at least one inclinometer (100) that is constructed and arranged to determine the misalignment of the orientation of the inclinometer flange (18) with respect to the vertical and that an evaluation means (98) is provided to determine from the inclinometer signal the rotational speed and the rotational phase.

6. A coupling device for connecting a first shaft (10) to a second shaft (12), having two mutually engaging flanges (16, 18, 22, 24), characterized in that at least one of the flanges or an element (20, 26) engaging the two flanges is provided with at least one transducer (50, 60, 70, 80, 90; 94) for generating an electrical signal and/or acoustic signal from mechanical movement, wherein the transducer generates the signal due to a periodic movement of the flanges relative to one another, at least when the relative movement of the two flanges with respect to one another results from a misalignment of the shafts during the relative movement of the shafts exceeds a specific value.

7. The device according to claim 6, characterized in that:
 the transducer is designed as a piezoelectric transducer (94), or
 that at least one of the flanges (16, 22) has means (50, 60, 70, 80, 90) for generating sound, wherein the other flange has at least an excitation member (34, 36, 74, 84, 136, 236) in order to form the transducer, wherein the excitation member is designed to activate the sound generating means by periodic axial and/or radial movement to generate sounds, when the relative movement of the two flanges with respect to each other that results from a relative misalignment of the shafts during the rotation of the shafts exceeds a specific value.

8. The device according to claim 7, characterized in that:
the flange (24) provided with the transducer (94) or the element (20, 26) provided with the transducer (94) has a telemetry device (98), in order to wirelessly transmit the transducer signals or signals derived from the transducer signals to a stationary unit, or
the sound-generating means is formed by a bell-shaped formation of the respective flange (16, 18, 22, 24), and wherein the excitation member (34, 36, 136, 236) is designed so as to stimulate the bell-shaped flange into acoustic vibrations by periodic contact when the relative movement of the two flanges with respect to each other results in a misalignment of the shafts (10, 12) during the relative movement of the shafts exceeds a specific value, or
the sound-generating means (50, 60) has a pump (52) that can be actuated by axial movement of the excitation member relative to the sound-generating means, as well as an air vibration generator (54), in order to convert a radial movement of the excitation member relative to the sound-generating means into an air stream that is set into self-induced vibration by means of the air vibration generator in order to generate a sound signal when the relative axial movement of the flanges (16, 18) with respect to each other that results from an angular offset of the shafts (10, 12) during the relative movement of the shafts exceeds a specific value, or
the sound-generating means (70, 80) has a vibration member (72, 82) that can be induced to vibrate by axial movement of the excitation member (74, 84) relative to the sound-generating means in order to generate a sound signal when the relative axial movement of the flanges with respect to each other that results from an angular offset of the shafts (10, 12) during the relative movement of the shafts exceeds a specific value.

9. The device according to claim 8, characterized by an evaluation device (96) that is adapted to determine the angular offset of the two shafts (10, 12) with respect to each other by analyzing the transducer signals, and that:
the evaluation device (96) forms a part of the telemetry device (98), or
the evaluation device (196) forms part of the stationary unit, or
the evaluation device (196) is designed so as to determine the instantaneous angle of rotation of the coupling device from attenuation between the antenna of the telemetry device and the antenna of the stationary unit that changes during one revolution of the coupling device, or
the excitation member (34) or at least one of the excitation members is designed in order to excite the bell-shaped flange (16) radial movement relative to said bell-shaped flange when the relative movement of the flanges with respect to one another that results from a parallel offset of the shafts (10, 12) during the relative movement of the shafts exceeds a specific value, or characterized in that the excitation member (36, 136, 236) or at least one of the excitation member is adapted to excite the bell-shaped flange (16, 22) by axial movement relative to the bell-shaped flange, when the in the rotation shafts (10, 12) resulting from a parallel offset of the shafts relative axial movement of the flanges (16, 18, 22, 24) with respect to each other that results from a parallel offset of the shaft (10, 12) during the relative movement of the shafts exceeds a specific value, or the vibration member has a membrane (72) and/or the excitation member is designed as a plunger or tappet (74, 84), or
the sound generating means (50, 60) has a sound pipe or whistle (54).

10. The device according to claim 8, characterized in that:
the excitation member (34) or at least one of said excitation members and the bell-shaped flange (16) is formed under a cross clapper (35), or
the flange (18, 22, 24) of the excitation member (34, 36, 136, 236) is also bell-shaped, or
the device has a microphone (40) for picking up airborne sound produced by the sound generating means (50, 60, 70, 80, 90) or by one of the flanges (16, 18, 22, 24).

11. The device according to claim 6, characterized in that the device has a speaker (92) in order to emit a sound signal corresponding to the transducer signal, at least when the axial and/or radial relative movement of the two flanges (22, 24) with respect to one another that results from a misalignment of the shafts (10, 12) during the rotation of the shafts exceeds a specific value.

12. A method for determining the misalignment of a first shaft (10) and a second shaft (12) which is connected to the first shaft by means of a coupling device (13), wherein the coupling device has two mutually engaging flanges (16, 18, 22, 24) which are bell-shaped in such a way that an encircling gap (28) exists between the flanges, wherein the misalignment of the two shafts with respect to each other can be determined from a visual inspection of the gap, or
that the chamfer edges (30, 32) bounding the gap or the gaps is smaller than the permissible misalignment.

13. The method according to claim 12, characterized in that the coupling device has a first coupling flange (16) for attachment to the first shaft, a second coupling flange (22) for attachment to the second shaft, as well as an intermediate piece (14) having a first intermediate piece flange (18) for engagement with the first coupling flange and a second adaptor flange (24) for engagement with the second coupling flange, and wherein the flanges are bell-shaped in such a way that in each case, an encircling axial gap (128, 129) exists between two mutually engaged flanges, wherein the misalignment of the two shafts with respect to each other is determined from a visual inspection of the two gaps, and/or
the misalignment of the two shafts with respect to each other is determined from a visual measurement of the gap or gaps at least two different radial directions, or
the coupling flanges are configured such that the resulting width of the gap is not more than three times the change in the gap width for the maximally permissible misalignment of the shafts in comparison to ideally aligned shafts.

14. The method according to claim 13, characterized in that:
the two different radial directions are at an angle of about 90 degrees to each other; or
the two different radial directions are at an angle of about 90 degrees to each other and that one of the radial directions is a vertical direction and the other of the radial directions is a horizontal direction, or
the two different radial directions are at an angle of about 90 degrees to each other and that, in each case, the radial offset of the edges (30, 32) of the coupling flanges (16, 22) is determined at the two opposite ends of the gap (28 to determine the components of the parallel offset of the shafts (10,12), or
the two different radial directions are at an angle of about 90 degrees to each other and that one of the radial directions is a vertical direction and the other of the radial direction is a horizontal direction, and that, in each case, the radial offset of the edges (30, 32) of the coupling flanges (16, 22) is determined at the two opposite-lying ends of the gap (28) in order to determine the components of the parallel offset of the shafts (10, 12).

15. The method according to claim 13, characterized in that:
- a picture of the gap (28) or the gaps (128, 129) is taken each time from at least two different radial directions and the gap or the gaps is or are measured based on the pictures, or
- the gap or the gaps is or are examined from the at least two different radial directions, or
- a picture of the gap (28) or the gaps (128, 129) is added and the analysis of the picture is conducted automatically.

* * * * *